A. K. CROSS.
DRAWING AND PAINTING GLASS.
APPLICATION FILED OCT. 16, 1916.
1,387,439.  Patented Aug. 9, 1921.
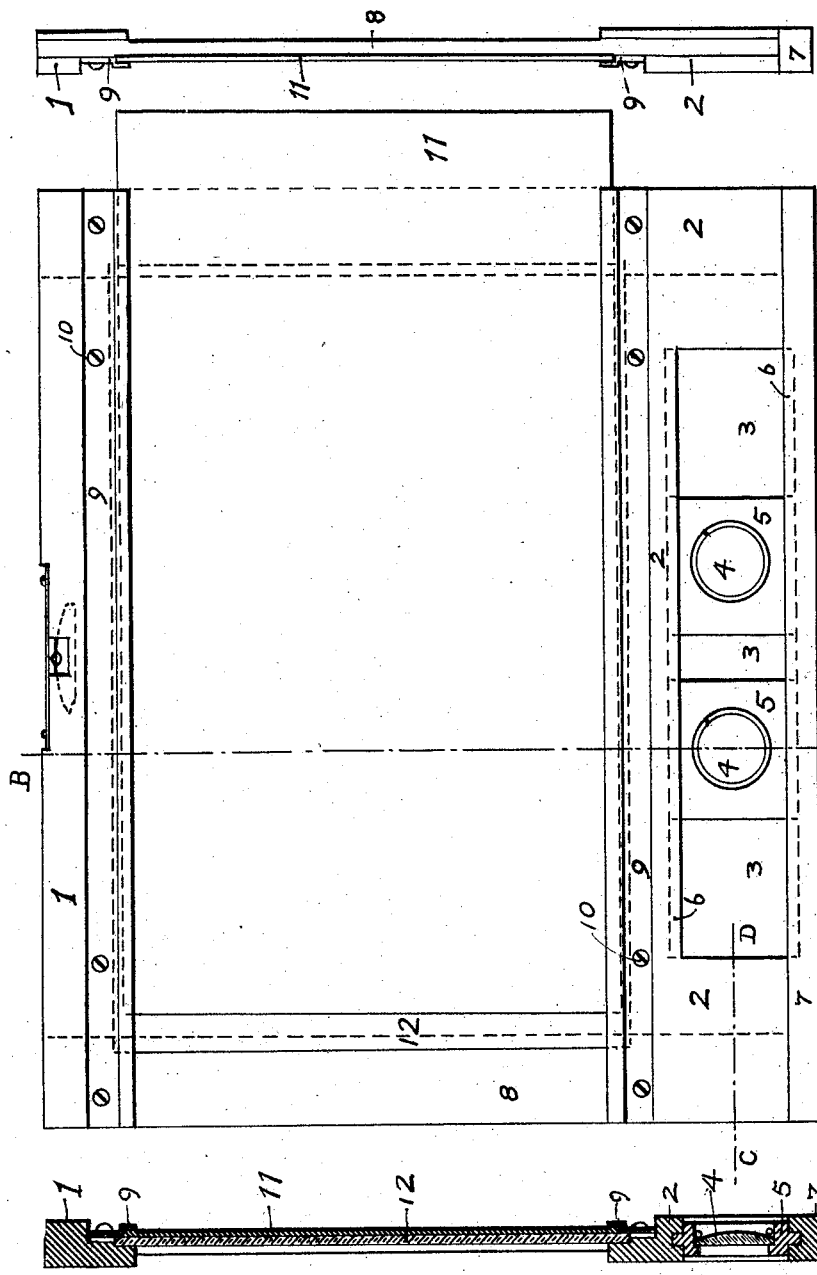
INVENTOR.
Anson K Cross
BY
ATTORNEYS.

UNITED STATES PATENT OFFICE.

ANSON K. CROSS, OF ASHLAND, MASSACHUSETTS.

DRAWING AND PAINTING GLASS.

1,387,439.   Specification of Letters Patent.   Patented Aug. 9, 1921.

Application filed October 16, 1916. Serial No. 125,834.

*To all whom it may concern:*

Be it known that I, ANSON K. CROSS, a citizen of the United States, residing at Ashland, in the county of Middlesex and State of Massachusetts, have invented new and useful Improvements in Drawing and Painting Glass, of which the following is a specification.

My invention relates primarily and generically to an instrument useful in the art of painting for correcting or testing the color values applied by the artist to the painting. Its object is to furnish a means which will enable artists and students to discover and correct mistakes in light and shade, and also in color. More specifically the invention relates to an addition for the purpose indicated to the drawing corrector disclosed in my patent granted October 15, 1912, No. 1,041,435, and has the further object in addition to that above stated, of making such drawing corrector a combined drawing and painting corrector as a complete and perfect instrument for enabling the untrained student to gain that perfect realization of nature's perspective appearances which has been the artist's lifelong ambition.

"Perspective" means the art of representing upon a plane surface the apparent forms and colors of objects behind this surface. Many ways of determining the lengths and angles of the lines upon the picture plane which will produce a true perspective have been discovered. Some of these ways are in the domain of theoretical geometry, and others, such as my invention of October 15, 1912, being in the line of such a practical demonstration of the picture plane as may be comprehended by those too young to study abstract science.

As far as I know no way of determining the apparent colors and values of objects behind the picture plane has ever been found which has been simple enough to be of use to the student in elementary schools. The result has been that while many art students have learned to draw well very few have learned to paint well, or at least have learned to do this in less than a life time of hard work. Thus artists and teachers generally believe that it is impossible to gain true vision in less than the life time of hard work in which the great artists of the past have discovered truth for themselves.

Though artists have used the camera, and the camera lucida, for the perspective of form they have not used them for making the perspective of colors behind the picture plane apparent to the student. Perspective changes the appearance of colors behind the picture plane just as much as it changes the appearance of the actual forms and my present improvement relates to the art of making these perspective changes in color as apparent to the casual observer as are the changes in form when this observer studies linear perspective with the aid of my drawing corrector.

Sir Joshua Reynolds in his discourses explained how the painter must see nature with the blurred vision of near sighted eyes but very few of the artists since his time have understood what he meant or gained the true vision of the great painters, for we inherit the vision of the scientist that looks for and sees only details. The student of painting fails to represent truly the few essential masses of light and dark and color because he exaggerates the importance of the details he sees in these masses.

The entire problem of the painter as far as it relates to nature's appearances is solved when the painter gains the power of visualizing appearances as if what he saw was in two dimensions only, and really existing on his chosen picture plane. Then forgetting the facts both of form and of color he sees instantaneously and correctly perspective effects and often paints a picture in one sitting with separate correct touches not needing change as to form or color.

The art of painting from nature will be no more difficult than that of painting from a copy when the student can be given a sure means for discovering how the actual colors of the objects behind the picture plane are often changed so as to appear entirely different colors. The student not provided with means for making the apparent colors on the chosen picture plane really objective can not progress rapidly.

I have found only one means of eliminating details not essential to the effect of a subject and of enabling the student to see the essentials upon his chosen picture plane, and this consists in the use of a convex lens of from ten to thirteen inches focal length. This is used by holding it far enough from the eyes for it to present a blurred picture of the chosen subject in which simply the big masses of light and shade and color are seen, all details being purposely blurred away. The student uses this properly only when he looks at it, for if he tries to look through it at the object behind it, he will see detail by straining and injuring his vision and losing the blurred effect the lens is intended to present. When the student looks at this lens instead of through it he begins to see color appearance on the picture plane of the lens and thus he begins to see correctly. But even with this lens his problem is still most difficult and not to be solved without long years of study.

But if in place of one lens he uses two lenses held in the same plane, so that one gives a blurred picture of the subject and the other gives a blurred picture of his painting which is placed a few feet distant from the subject, he will be able instantly to see where they differ, if he looks at these lenses instead of through them at his painting and at nature. It is easy to compare two paintings but not easy to compare a painting of nature with nature. The two lenses simplify the problem by making the comparison simply that of two blurred pictures, both in the same plane, and the instant the student uses them rightly and looks at them instead of through them he begins to see with the painter's vision and discover wherein the blurred picture of his painting differs from the blurred picture of the subject.

We are born with the eyes of the scientist that see detail and it is natural for the student to look through one lens at his subject and then through the other lens at his painting but this vision will never give him the painter's eyes. To obtain these he must not focus his eyes upon either lens but must gaze with a focus as for distant vision, so as to see both equally and indistinctly; and this indistinct vision, increasing the blur given by the lenses suddenly results in a new vision—that of the painter—which sees appearances on a picture plane, in place of the facts behind this plane. The principal value of the lenses may thus be gained very quickly and result in a natural blurred vision that will enable the student to often dispense with the lenses.

This does not mean that the student will have no further use for the lenses for even the best artists often turn to the spirit level for tests of angles, and as a matter of fact many of the best painters are daily using my drawing and painting corrector as an aid both in the drawing and in the color of their paintings.

Before my invention criticism of color as to its truth has been purely a matter of feeling and so it is now, with the vast majority of artists and teachers who have not realized the possibility of a scientific test for the truth of color appearances. My invention thus fills the need of every teacher and artist and student for means for self criticism that are complete and exact for not only the simple form but also the more difficult color appearances.

To use the painting corrector both the subject and the painting must be in full light and if the painting is smaller than the subject it should be enough nearer the eye for it to blur in one lens of the same size that the subject blurs in the other lens.

Having thus shown how even the professional artist corrects his painting as to drawing by use of the spirit level and as to color by use of two magnifying glasses, I have in general terms described my invention of one instrument combining the spirit level and the lenses in the best form for general use.

I prefer to place the two lenses in the lower side of the frame of my drawing corrector. They may be inserted in two holes cut in the frame in which case the adjustment to cause one lens to reflect the subject and the other the painting may be made by varying the distance of the painting from the subject, or by varying the distance of the frame from the eye until the subject may be seen in one lens and the painting in the other lens, it being understood always that only one eye is to be used for both lenses the other being kept closed.

I prefer to insert the lenses in the frame so that their distance apart may be varied thus enabling the lenses to be moved in the frame so that one may cover the subject and the other the painting regardless of the distance at which the frame may be held from the eye.

My invention may be applied in many different ways for the student will profit equally from all ways which enable him to compare images produced side by side, one of his subject and the other of his painting. These images may be objective and visible to more than one observer or they may be visible only to the one eye at which the rays from both lenses converge.

A few details in improvements upon the construction of the patent of October 15, 1912, I have shown and claim.

The common carpenter's level is adjusted to read true only when its sides are in vertical planes. Even the best levels will not read true if they are revolved forward or backward while resting on one edge in a horizontal surface. In my drawing tablet the level must indicate the horizontal when the frame is inclined ten or twenty degrees away from the vertical. This makes the adjustment of the level a very difficult matter. I have therefore designed an improved form of spirit level tube in which the top only is curved in the usual manner while the sides are parallel vertical surfaces and the bottom at right angles to the sides. I insert this tube in a recess so cut with a small circular saw that the tube fits closely therein. The plane of the curve of the tube is thus fixed parallel with the frame. Thus the adjustment of the level is simple and it will read true when the frame is vertical or when it is as much inclined as need be, to give a true picture of objects below or above the eye level, and a reasonable distance away.

In order to reduce the cost of the device to the minimum so that it may be furnished to the user at the lowest possible price, I have designed the construction of the frame to be such that the end pieces or short sides of the frame may pass bodily through the ends of the longer frame members without themselves being reduced at their ends, as hereinafter described in detail.

In my patent of October 15, 1912, the strips holding the glass in place were of wood and held in place by turning all the screws down as far as they would go. The glass was thus under tension all the time and would often break in transit. I have found that this direct pressure on the glass will cause it to break from atmospheric changes. To overcome this difficulty I now make the holding strip of spring metal or other material stiff enough to keep the glass from rattling but not to break the glass by pressure of the spring toward its center. I avoid any direct pressure of the central screws upon the glass, and obtain the required tension of the spring by slightly curving the strips when they are formed in the die, or by curving a straight strip by pressure of the two inner screws upon the strip, but not upon the glass.

I attain these objects by the mechanism illustrated in the accompanying drawing, in which—

Figure 1 is an elevation showing the rear of the tablet.

Fig. 2 is a right side view.

Fig. 3 is a section on line A—B.

Fig. 4 is a section on line C—D.

Fig. 5 is a side view enlarged of the spirit level tube.

Fig. 6 is a central cross section of the spirit level tube.

Similar letters indicate the same parts in all the views.

The upper side 1 of the frame is made as in my patent of October 15, 1912, except that the recess for the spirit level is preferably cut with a small saw instead of with a drill.

The under side 2 is preferably much wider than the upper side, and its central part is cut out to form the space 3 for the sliding lenses 4, 4. These lenses are held in blocks 5, 5 whose upper and lower sides are provided with ribs, as shown in Fig. 3, fitted to slide in grooves 6, 6 cut in the under side 2 of the frame and the upper side of the covering piece 7, which is screwed to piece 2 and holds the lenses in place.

The end pieces 8, 8 are held by means of glue and brads in the sides 1 and 2. They pass bodily through these sides in their full thickness, the mortises in the sides 1 and 2 being cut preferably with two circular saws, one of which is a little larger than the other, operating together at the same time.

The binding strips 9, 9, I prefer to stamp of metal, though celluloid or hard rubber or fiber may be used. I have shown screws 10 to hold these strips. The two outer screws in each strip are turned in as far as they will go and the spring tension of the strip is regulated by the inner screws. Said strips overlap respectively the top and bottom edges of a glass pane 12 which is set into grooves in the members of the frame, and by bearing on such edges, retain the plane in place. The lower edge of the upper binding strip, and the upper edge of the lower strip, are offset rearwardly sufficiently to provide runways adapted to admit the opposite side edges of a tablet, board, or card 11 of opaque material, such as cardboard, paper, or the like, which therefore may be slipped into place back of the glass pane to provide a background over which drawings may be made on the glass, and may be removed at will to permit a drawing so made to be compared with the subject by being held between the subject and the student's eye, in a manner fully explained in my aforesaid prior patent.

111 represents the spirit level, having a longitudinally curved and transversely convex top wall 121, plane parallel side walls 13, and a bottom wall 14, which may be straight, as shown, or convex. When this level is set into a groove or kerf properly located in the frame, as shown in the drawing, its flat sides give it the essentially correct position with respect to the lines of the frame, and it may be there permanently secured by an adhesive or other retaining means. A notch 15 cut in the frame enables the air bubble in the level to be seen when the frame is held with its top and bottom members horizontal. I do not claim the spirit level in this application but announce my purpose to protect it by a seasonably filed divisional application.

Having described the use of the improvement upon my patent of October 15, 1912, I will now describe the use of my perfected inventen from the start to the end of the painting which its proper use will enable the student to produce in a fraction of the time required when my invention is not employed.

The artist first composes the lines and masses of his subject so as to produce a pleasing composition. He does this by making a series of small sketches from which he selects the best. When using my tablet he would draw these in outline upon the tablet and would correct each drawing by holding it up before the subject to see if its lines will cover those of the subject when the spirit level indicates that the tablet is held level. When correct each sketch would be transferred to paper of the same size as the tablet. When a satisfactory composition and sketch of the subject is finally obtained upon the transparent tablet this drawing is transferred to the canvas upon which the painting is to be made by enlarging its lines and forms by eye alone, or by the use of small squares drawn on or behind the transparent tablet and the same number of large squares drawn upon the canvas. The drawing upon the canvas is then made by placing its lines so they will intersect the squares upon the canvas in the same relative positions that the intersections come in the small sketch on the tablet.

A simpler test for the proportions of the larger drawing may be gained by holding the transparent tablet in front of and parallel with the canvas and at such a distance that it covers the canvas. In this position the lines of the drawing on the tablet will cover those of the correct enlargement upon the canvas behind the tablet.

When the enlarged drawing upon the canvas is satisfactory the colors are added in their proper places and when the canvas is covered the lenses are used to test the colors. Mistakes in colors are evident to even the beginner when one lens reflects the subject and the other the painting. Thus the student may correct each mistake until the color is perfect throughout the canvas.

A final test to see that the drawing has not been lost while obtaining the colors should now be made. The chief value of my invention lies in the fact that it makes it even easier for the student to learn to paint than to learn to draw and thus he may profitably study both drawing and painting at the same time and save many of the years of study usually required before true vision is possible.

In using the corrector for color testing the spirit level is equally as important as when used in connection with transparent tablet for testing the accuracy of the lines of a drawing. In either case the spirit level establishes the true horizontal and enables the student or artist to appreciate the relation of the color masses and outlines of the subject to the horizon. The spirit level is not used to level the frame when the drawing or painting is being made. In testing the drawings the frame is leveled in order that the student may observe whether or not the lines of the drawing bear the same relations to the horizontal and vertical (shown by the edges of the frame), as the lines of the subject bear. In connection with the test of a painting, the spirit level enables the student to hold an edge of the frame or holder horizontal, and with reference thereto, to observe the relation of the color masses. A successful painting consists in the combination of the right colors in the right places, and the spirit level in coöperation with the lenses helps the artist and student to accomplish this result by providing a reference line or frame for the preliminary study of the subject and the subsequent comparison of the painting and the subject.

My present invention in a painting corrector is not altogether dependent upon the combination with a drawing corrector, and therefore consists generically in the combination of means for producing blurred images of the subject and the painting with a spirit level and a holder having a reference edge or line. The frame typifies any such holder. For those who have outgrown the need of the transparent tablet as a drawing corrector, I prefer to combine the lenses and spirit level in a holder having a small rectangular opening which may serve as a finder through which the subject may be studied before the picture of it is painted.

The results of proper use of my invention prove that any one of average intelligence can learn to draw and paint truthfully. The art student must, however, realize that this truth alone does not often constitute a work of art and therefore I do not give any rules for the student. Final excellence is more a matter of true vision and artistic feeling than of that truth which may be gained by mechanical means of measuring and testing or by any specified method of work. Art is beyond merely truthful facts and the value of my invention to the artist lies in the fact that it enables him to overcome quickly all the difficulties involved in truthful drawing and painting, and thus makes him free to express himself spontaneously without thought or effort or unpleasant untruths.

My invention may be used as a mechanical aid to results on paper or canvas made before true vision has been gained but when thus used the chief value of my invention is lost for really good work is impossible as long as the student must depend principally upon mechanical aids and tests in place of the correct vision that my invention is intended to give.

The proper use of my invention is for the correction of vision even more than for the correction of drawings and paintings and thus correct visions should be attained by making an extended series of quick sketches for action, construction, and effect in place of that finish and detail which too often occupies the attention of the beginner so that he often never learns to see and draw truly.

Having described my invention, I claim:

1. A painting corrector comprising a spirit level and means for producing side by side two blurred images, one of the subject and the other of its representation, and a frame in which said elements are so mounted that the spirit level indicates the correct leveling of both the frame and the image-producing means.

2. A drawing and painting corrector comprising a spirit level, a transparent tablet, means for producing side by side two blurred images, one of the subject and the other of its representation, and a frame in which said elements are mounted, the spirit level being so placed as to indicate at the same time the correct leveling of both the frame and the image-producing means.

3. A drawing and painting corrector comprising a spirit level, a transparent tablet with an opaque tablet behind it, means for producing side by side two blurred images, one of the subject and the other of its representation, and means for mounting and holding said elements so that the spirit level may indicate the correct leveling of the last named means and the image-producing means.

4. A painting corrector comprising a spirit level, adjustable means for producing side by side two blurred images, one of the subject and the other of its representation, and a frame in which said elements are so mounted that the spirit level indicates the correct leveling of both the frame and the image-producing means.

5. A drawing and painting corrector comprising a frame, a transparent tablet in said frame, lenses adapted to transmit blurred images of a subject and a painting of such subject respectively, said lenses being mounted in the frame with provision for adjustment toward and away from one another, and a spirit level fixed to the frame and positioned to indicate the correct leveling of said frame and thereby of the tablet and lenses.

In testimony whereof I have affixed my signature.

ANSON K. CROSS.